(12) United States Patent
Long

(10) Patent No.: US 11,192,303 B2
(45) Date of Patent: Dec. 7, 2021

(54) MULTI-MEDIA STEREO ADDITIVE PRINTER

(71) Applicant: HEFEI AIRWREN AUTOMATIC EQUIPMENT CO., LTD., Anhui (CN)

(72) Inventor: Mei Long, Anhui (CN)

(73) Assignee: HEFEI AIRWREN AUTOMATIC EQUIPMENT CO., LTD., Anhui (CN)

( * ) Notice: Subject to any disclaimer, the term of this patent is extended or adjusted under 35 U.S.C. 154(b) by 632 days.

(21) Appl. No.: 16/307,474

(22) PCT Filed: Oct. 31, 2018

(86) PCT No.: PCT/CN2018/112968
§ 371 (c)(1),
(2) Date: Dec. 5, 2018

(87) PCT Pub. No.: WO2020/062398
PCT Pub. Date: Apr. 2, 2020

(65) Prior Publication Data
US 2021/0154929 A1    May 27, 2021

(30) Foreign Application Priority Data

Sep. 27, 2018   (CN) .......................... 201811130542.5

(51) Int. Cl.
*B29C 64/241*   (2017.01)
*B33Y 30/00*   (2015.01)
(Continued)

(52) U.S. Cl.
CPC .......... *B29C 64/241* (2017.08); *B29C 64/106* (2017.08); *B29C 64/209* (2017.08); *B33Y 30/00* (2014.12)

(58) Field of Classification Search
CPC .......... B22F 10/18; B22F 10/22; B22F 10/25; B22F 12/226; B22F 12/37; B29C 64/106;
(Continued)

(56) References Cited

U.S. PATENT DOCUMENTS 2,345,177 A * 3/1944 Briney, Jr. .............. B24B 31/10
451/177
2,360,921 A * 10/1944 Wiken .................... B23B 39/00
408/234
(Continued)

FOREIGN PATENT DOCUMENTS

CN    205058627    *   3/2016
CN    104015355    *   9/2021

OTHER PUBLICATIONS

CN 201811130542.5 Second Office Action (Translation) dated Aug. 7, 2020, retrieved online from Espace.net (Oct. 14, 2021) (Year : 2020).*

(Continued)

*Primary Examiner* — Joseph S Del Sole
*Assistant Examiner* — Manley L Cummins, IV
(74) *Attorney, Agent, or Firm* — JCIPRNET

(57) ABSTRACT

The present application proposes a multi-media three-dimensional additive printer, comprising: a column, a top plate, a turntable and a printing platform; the column is a vertically installed circular cylinder, and the top plate is horizontally mounted on the column; a plurality of printing nozzles are mounted on the lower surface of the top plate, and each of the printing nozzles slides in a direction in which the radius of the column is extended; the turntable is rotatably mounted on the column and disposed coaxially with the column, and the turntable is relatively stationary with the column in the vertical direction; the printing platform is horizontally mounted on the turntable and rotates synchronously with the turntable. In the present application,
(Continued)

correspondingly, the two-dimensional plane is defined by the circumference and the radius, so that the movement of the printing platform and the printing nozzle is more convenient and quick, and the movement of the printing platform and the printing head is stabilized, thereby improving the printing quality.

10 Claims, 4 Drawing Sheets

(51) Int. Cl.
    *B29C 64/209*     (2017.01)
    *B29C 64/106*     (2017.01)

(58) Field of Classification Search
    CPC ... B29C 64/112; B29C 64/118; B29C 64/241; B33Y 10/00; B33Y 30/00; B23D 53/06; Y10T 408/5616
    See application file for complete search history.

(56) References Cited

U.S. PATENT DOCUMENTS

| | | | | |
|---|---|---|---|---|
| 9,849,631 | B1* | 12/2017 | Goss | B29C 64/241 |
| 2006/0245834 | A1* | 11/2006 | Lay | B23Q 1/5412 |
| | | | | 408/89 |
| 2013/0189435 | A1* | 7/2013 | Mackie | B33Y 30/00 |
| | | | | 427/256 |
| 2014/0265034 | A1* | 9/2014 | Dudley | B29C 64/245 |
| | | | | 264/401 |
| 2016/0257068 | A1* | 9/2016 | Albert | B29C 64/255 |
| 2018/0117898 | A1* | 5/2018 | Skogsrud | B29C 64/393 |

OTHER PUBLICATIONS

PCT/CN2018/112968's Written Opinion of the International Searching Authority (Translation) dated Mar. 30, 2021, retrieved online from Espace.net (Oct. 14, 2021) (Year: 2021).*

* cited by examiner

MULTI-MEDIA STEREO ADDITIVE PRINTER

CROSS-REFERENCE TO RELATED APPLICATION

This application is a 371 application of the international PCT application serial no. PCT/CN2018/112968, filed on Oct. 31, 2018, which claims the priority benefit of China application no. 201811130542.5, filed on Sep. 27, 2018. The entirety of each of the above-mentioned patent applications is hereby incorporated by reference herein and made a part of this specification.

BACKGROUND

Technical Field

The present application relates to the field of three-dimensional printing technology, and in particular, to a multi-media stereo additive printer.

Background Art

With the continuous development of industrial modernization, three-dimensional stereo printers have emerged, and three-dimensional printers can also be referred to as 3D printers for short. The 3D printer produces high material utilization rate, fast processing speed, short time, and more uniform density of molded products. It can realize the product structure that designers can think of, and it has design and practicality. Therefore, because of the advantages of 3D stereo printer, it has wide range of applications, such as in medical, construction, food, automobile and other industries, and plays a certain role, especially in education, which plays an important role in students' innovative practice and teachers' improvement of teaching effect.

SUMMARY OF THE INVENTION

Based on the technical problems existing in the background art, the present application disclosed a multi-media stereo additive printer.

The present application provides a multi-media three-dimensional additive printer, comprising: a column, a top plate, a turntable and a printing platform;

the column is a vertically installed circular cylinder, and the top plate is horizontally mounted on the column; a plurality of printing nozzles are mounted on the lower surface of the top plate, and each of the printing nozzles slides in a direction in which the radius of the column is extended;

the turntable is rotatably mounted on the column and disposed coaxially with the column, and the turntable is relatively stationary with the column in the vertical direction; the printing platform is horizontally mounted on the turntable and rotates synchronously with the turntable.

In a preferred embodiment, an annular plate is further included, and the annular plate is sleeved on the column, fixedly connected to the column and supported under the turntable.

In a preferred embodiment, at least three telescopic rods are mounted on the column, and the telescopic rod extends in a direction parallel to the axial line of the column; the turntable is sleeved on the outer circumference of the column, and the telescopic rods are polygonally distributed under the turntable and abut the turntable, the telescopic rods are used to drive the turntable to slide on the column.

In a preferred embodiment, an annular groove is provided in the inner circumference of the turntable, and an annular protrusion matching the annular groove is provided on the column.

In a preferred embodiment, a plurality of first cylinders are mounted on the top plate surface, each first cylinder corresponds to one printing nozzle and is coupled to the corresponding printing nozzle, used to drive the printing nozzle to move in a vertical direction.

In a preferred embodiment, a plurality of second cylinders are mounted on the top plate surface, each second cylinder corresponds to one first cylinder, and each second cylinder is used to drive the corresponding first cylinder to slide along the radius of the column in the top plate.

In a preferred embodiment, a motor and a driving gear are further included, the driving gear is coaxially and drivingly connected with the output shaft of the motor, the turntable has a gear structure, and the driving gear is engaged in the turntable.

In a preferred embodiment, a first support rod and a second support rod are further included, and the first support rod and the second support rod respectively support under the top plate and fixedly connected with the top plate, and the projections of the first support rod, the second support rod and the column on the horizontal plane forms a triangular structure.

In a preferred embodiment, a first supporting leg and a second supporting leg are further included, both mounted under the printing platform, and the bottom of the first supporting leg and the second supporting leg are mounted with a pulley; The first support leg and the second support leg cooperate with the column to form a triangular support structure.

In a preferred embodiment, the pulley is a universal wheel.

The multi-media three-dimensional additive printer is provided in the present application, the turntable is rotatably mounted on the column, and the printing nozzle is slidably mounted in a radial direction of the circle where the turn track of the turntable is located with respect to the column. In this way, by the relative rotation and relative sliding between the printing nozzle and the turntable, it can realized that the projection of the printing nozzle on the printing platform can be adjusted at any position, thereby completing the printing work.

In the present application, correspondingly, the two-dimensional plane is defined by the circumference and the radius, so that the movement of the printing platform and the printing nozzle is more convenient and quick, and the movement of the printing platform and the printing head is stabilized, thereby improving the printing quality.

DETAILED DESCRIPTION OF THE INVENTION

Figure 1:
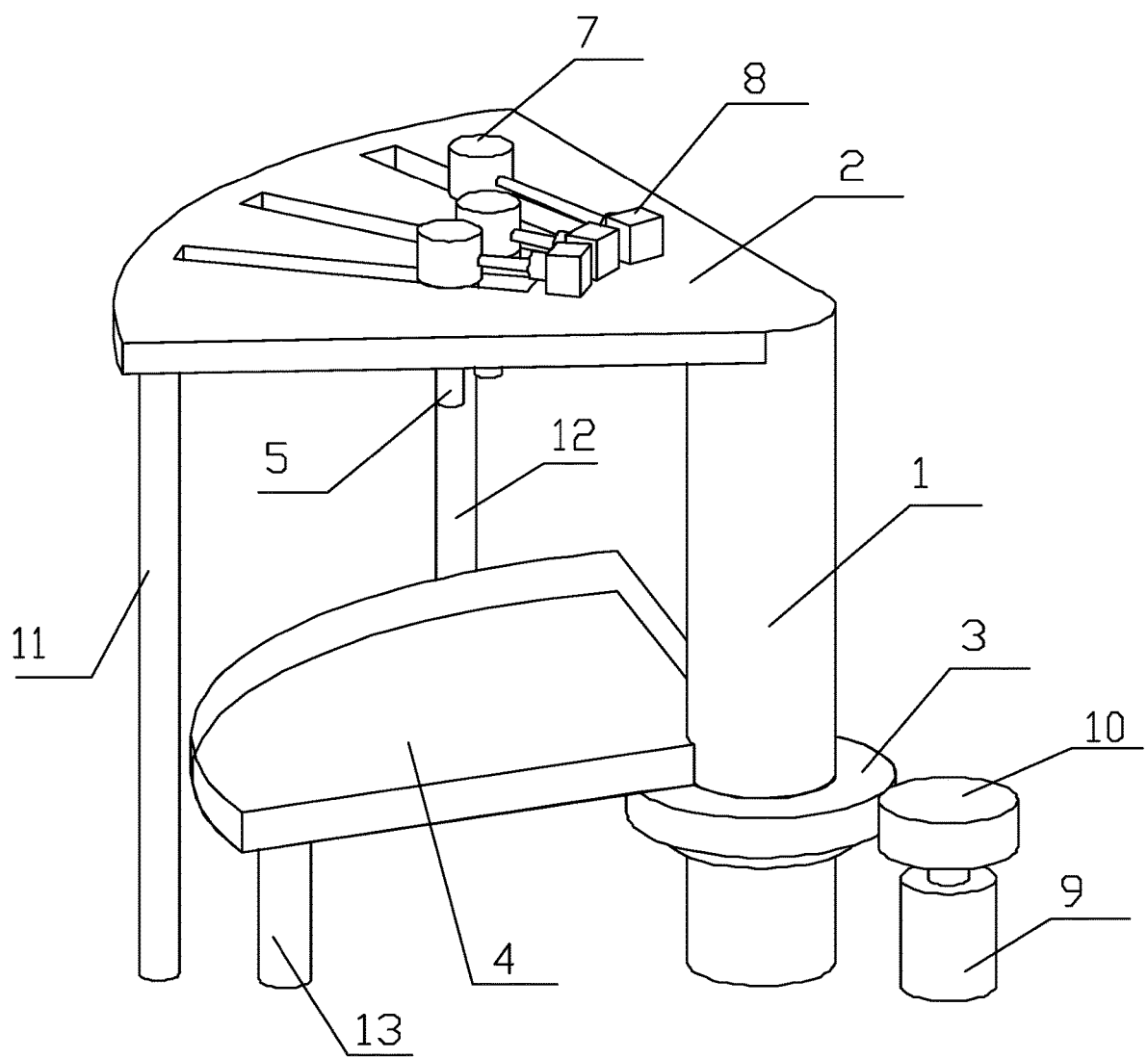
FIG. 1 is a first perspective perspective view of a multi-media stereo additive printer according to the present application.
Figure 2:
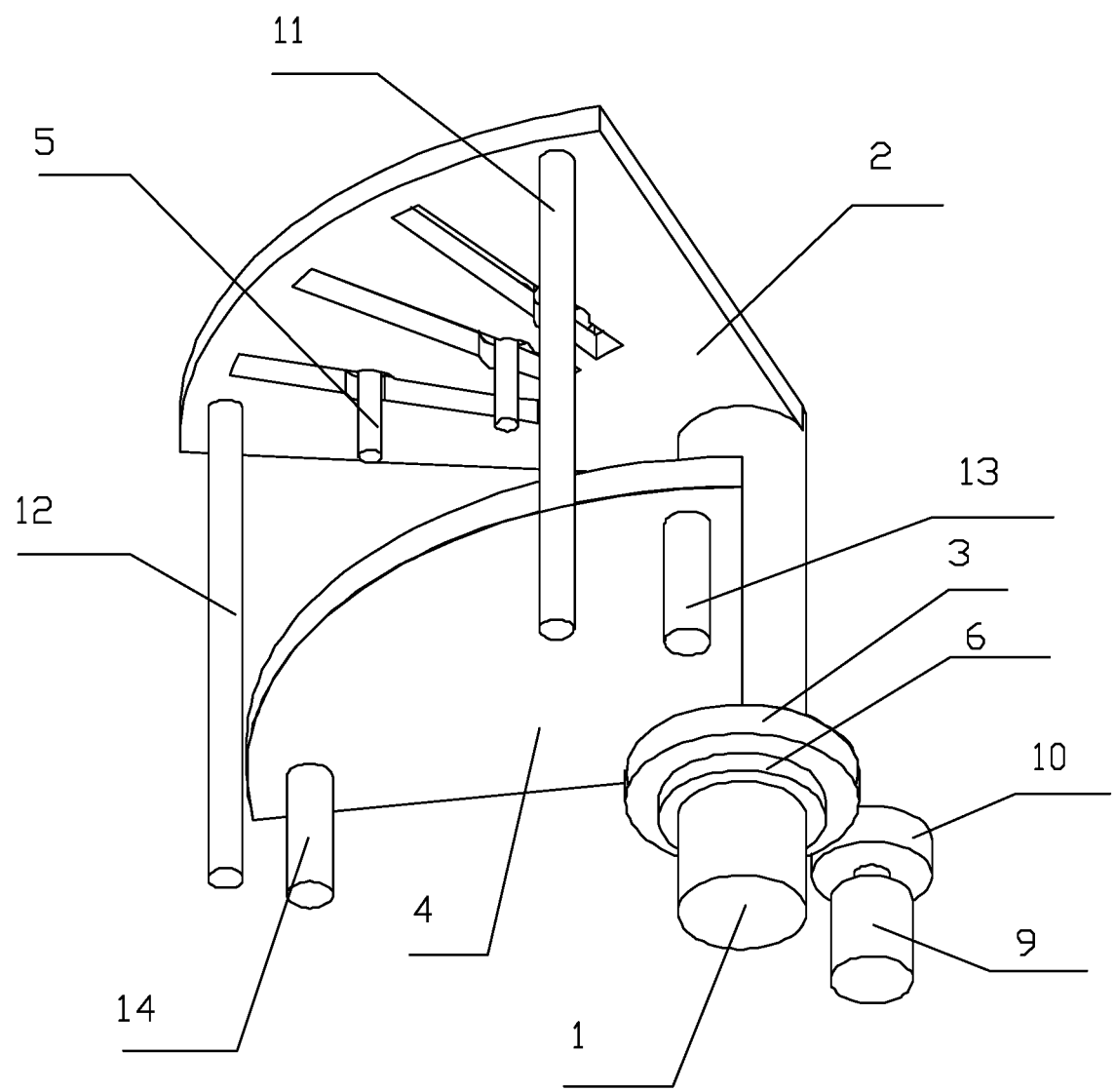
FIG. 2 is a second perspective view of a multi-media stereo additive printer according to the present application.
Figure 3:
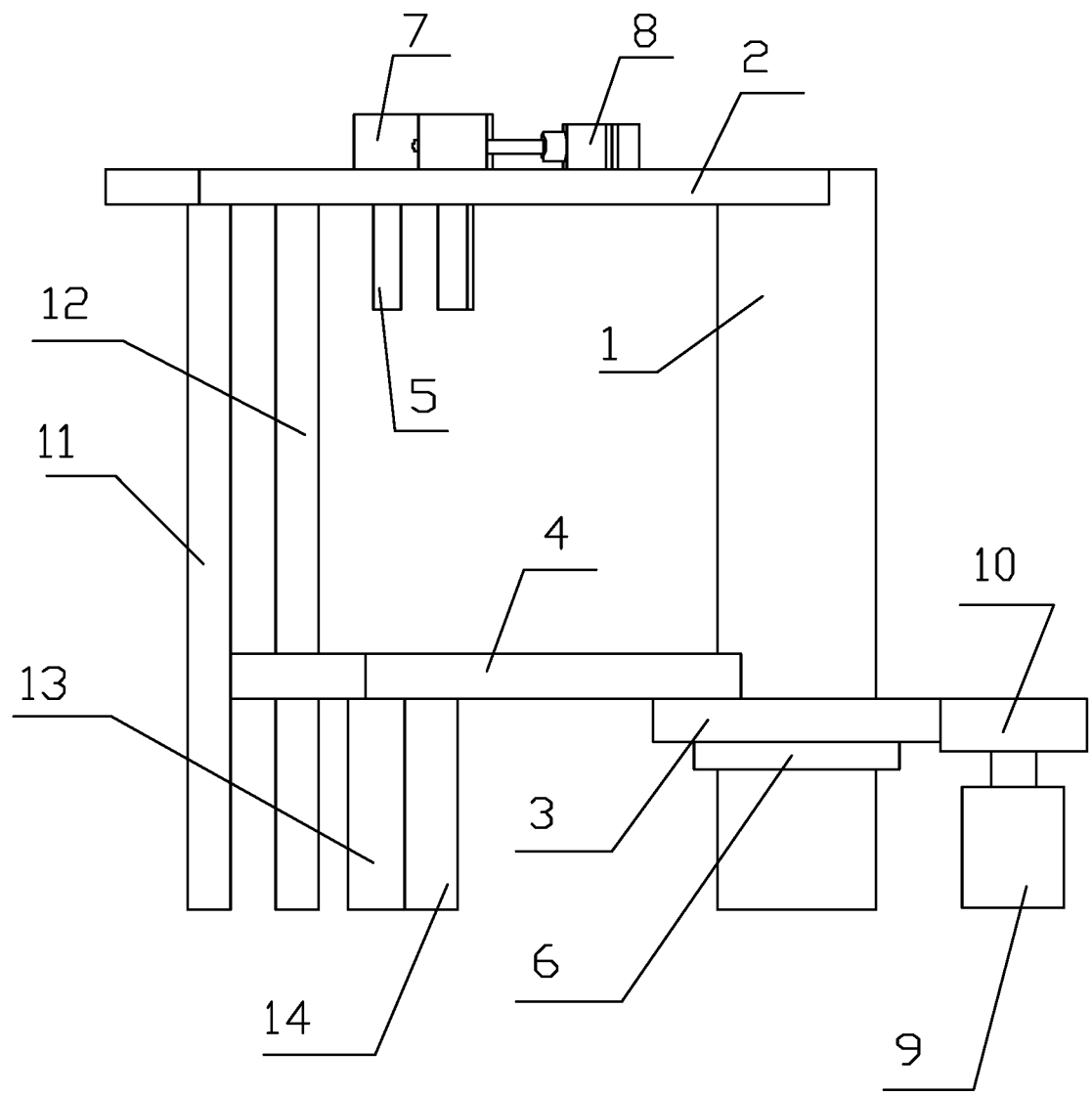
FIG. 3 is a front elevational view of FIG. 1.
Figure 4:
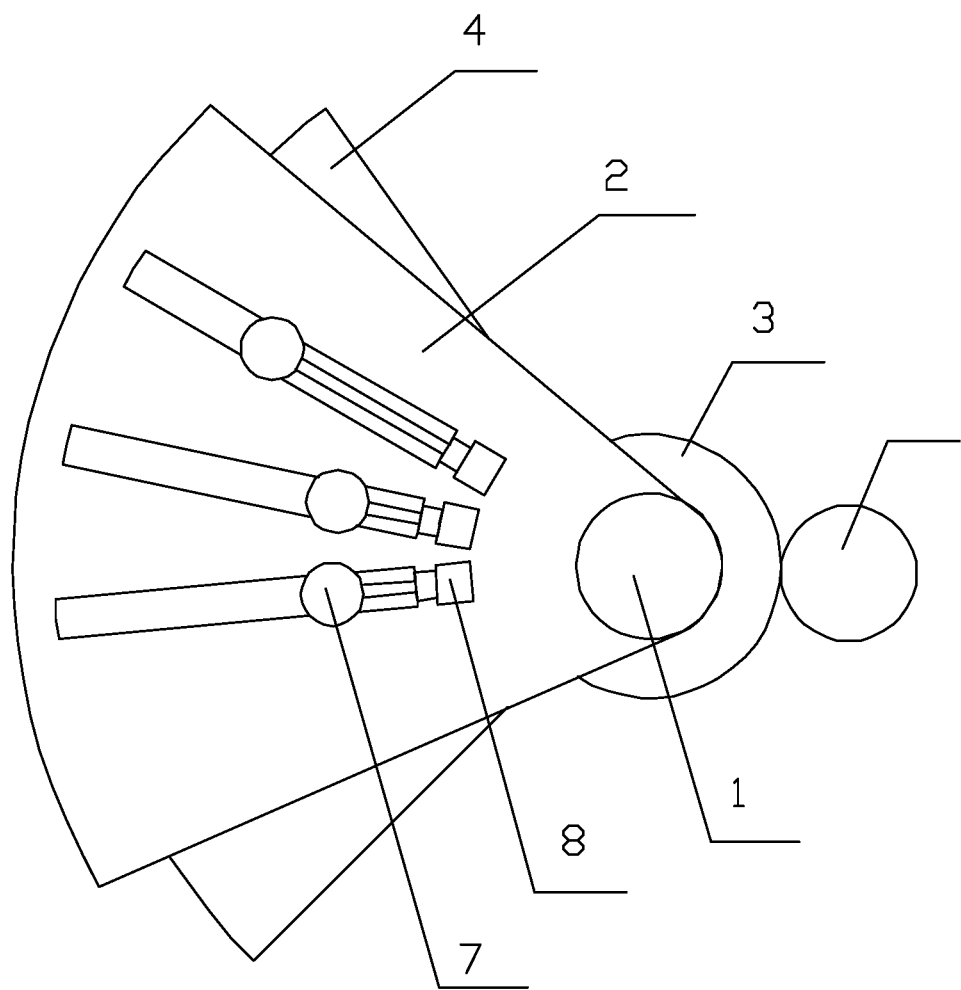
FIG. 4 is a top view of FIG. 1.

Referring to FIGS. 1-4, the present application provides a multi-media three-dimensional additive printer, which comprises: a column 1, a top plate 2, a turntable 3 and a printing platform 4;

The column 1 is a vertically installed circular cylinder, and the top plate 2 is horizontally mounted on the column 1; a plurality of printing nozzles 5 are mounted on the lower surface of the top plate 2, and each of the printing nozzles 5 slides in a direction in which the radius of the column 1 is extended. The setting of a plurality of printing nozzles 5 can meet the requirements of color printing, and realize one color output through one printing nozzle, to avoid color crosstalk caused by multiple colors output through the same printing nozzle.

The turntable 3 is rotatably mounted on the column 1 and disposed coaxially with the column 1, and the turntable is relatively stationary with the column 1 in the vertical direction; the printing platform 4 is horizontally mounted on the turntable 3 and rotates synchronously with the turntable 3. The printing platform 4 is horizontally mounted on the turntable 3 and rotates in synchronization with the turntable 3.

In this way, in the present embodiment, the turntable 3 is rotatably mounted on the column 1, and the printing nozzle 5 is slidably mounted in a radial direction of the circle where the turn track of the turntable 3 is located with respect to the column 1. In this way, by the relative rotation and relative sliding between the printing nozzle 5 and the turntable 3, it can realized that the projection of the printing nozzle 5 on the printing platform 4 can be adjusted at any position, thereby completing the printing work.

In a further embodiment of the present application, an annular plate 6 is further included, and the annular plate 6 is sleeved on the column 1, fixedly connected to the column 1 and supported under the turntable 3. Thus, the turntable 3 is stopped in the vertical direction by the annular plate 6, so that the turntable 3 is prevented from slipping. Specifically, an annular groove is provided in the inner circumference of the turntable 3, and an annular protrusion matching the annular groove is provided on the column, to stopping the turntable 3 in vertical direction.

In a further embodiment of the present application, a plurality of first cylinders 7 are mounted on the top plate 2 surface, each first cylinder 7 corresponds to one printing nozzle 5 and is coupled to the corresponding printing nozzle 5, used to drive the printing nozzle 5 to move in a vertical direction. In this way, the vertical distance between the print head 5 and the printing platform 4 can be adjusted, thereby further improving the print quality. Specifically, in the embodiment, a plurality of second cylinders 8 are mounted on the top plate 2 surface, each second cylinder 8 corresponds to one first cylinder 7, and each second cylinder 8 is used to drive the corresponding first cylinder 7 to slide along the radius of the column 1 in the top plate 2. Thus, the second cylinder 8 provides a basis for the intelligent linear motion of the print head 5, which is advantageous for improving the accuracy of the print head movement.

In a further embodiment of the present application, a motor 9 and a driving gear 10 are further included, the driving gear 10 is coaxially and drivingly connected with the output shaft of the motor 9, the turntable 3 has a gear structure, and the driving gear 10 is engaged in the turntable 3. In this way, the turntable 3 can be driven to rotate through gear transmission by the motor, thereby realizing the mechanical control of the rotation of the turntable 3.

In a further embodiment of the present application, a first support rod 11 and a second support rod 12 are further included, and the first support rod 11 and the second support rod 12 respectively support under the top plate 2 and fixedly connected with the top plate 2, and the projections of the first support rod 11, the second support rod 12 and the column 1 on the horizontal plane forms a triangular structure. Thus, the top plate 2 is supported by the first support rod 11, the second support rod 12 and the column 1 in a triangular shape, which ensures the stability of the installation of the top plate 2, thereby beneficial to the stability of the movement of the printing nozzle 5.

In a further embodiment of the present application, a first supporting leg 13 and a second supporting leg 14 are further included, both mounted under the printing platform 4, and the bottom of the first supporting leg 13 and the second supporting leg 14 are mounted with a pulley; The first support leg 13 and the second support leg 14 cooperate with the column 1 to form a triangular support structure. In this way, the first support leg 13 and the second support leg 14 cooperate with the turntable 3 to support the printing platform 4, which is beneficial to ensure the stability of rotation of the printing platform 4; the arrangement of the pulleys is beneficial to reduce the friction and further improve the stability of the movement of the printing platform 4, so as to ensure the stable printing work during the rotation of the printing platform 4. Specifically, the pulley is a universal wheel.

Specifically, in another embodiment of the present application, the annular plate is replaced by at least three telescopic rods mounted on the outer circumference of the column parallel to the axial line of the column. In the present embodiment, the turntable 3 is sleeved on the outer circumference of the column 1, and the telescopic rods are polygonally distributed under the turntable 3 and abut the turntable 3, the telescopic rods are used to drive the turntable 3 to slide on the column 1. Thus, in the present embodiment, by the movement of the telescopic rod, the turntable 3 and the printing platform 4 can be moved along the vertical direction of the column 1 to realize the vertical movement of the printing platform 4, to ensure the stereoscopic effect of the additive printing. Specifically, in the embodiment, the first supporting leg 13 and the second supporting leg 14 both are telescopic structures, so that the first supporting leg 13 and the second supporting leg 14 are adjusted in length according to the expansion and contraction of the telescopic rod, to ensure that the horizontal installation of the printing platform is reliable.

The above is only the preferred embodiment of the present application, but the scope of protection of the present application is not limited thereto, and any equivalents or modifications of the technical solutions of the present application and the application concept thereof should be included in the scope of the present application within the scope of the technical scope of the present application.

What is claimed is:

1. A multi-media three-dimensional additive printer, comprising:
   a column, a turntable and a printing platform is a vertically installed circular cylinder, and the top plate is horizontally mounted on the column;
   a plurality of printing nozzles are mounted on a lower surface of the top plate, and each of the printing nozzles slides in a direction in which the radius of the column is extended;

the turntable is rotatably mounted on the column and disposed coaxially with the column, and wherein the printing platform is horizontally mounted on the turntable and rotates synchronously with the turntable.

2. The multi-media three-dimensional additive printer according to claim 1, further comprising an annular plate, and wherein the annular plate is sleeved on the column, fixedly connected to the column and supported under the turntable.

3. The multi-media three-dimensional additive printer according to claim 1, wherein at least three telescopic rods are mounted on the column, wherein the at least three telescopic rods extend in a direction parallel to an axial line of the column; wherein the turntable is sleeved on the outer circumference of the column, wherein the at least three telescopic rods are polygonally distributed under the turntable and abut the turntable, and wherein the at least three telescopic rods are used to drive the turntable to slide on the column.

4. The multi-media three-dimensional additive printer according to claim 1, wherein an annular groove is provided in an inner circumference of the turntable, and wherein an annular protrusion matching the annular groove is provided on the column.

5. The multi-media three-dimensional additive printer according to claim 1, wherein a plurality of first cylinders are mounted on the top plate, wherein each first cylinder corresponds to one printing nozzle and is coupled to the corresponding printing nozzle, and wherein each first cylinder is used to drive the corresponding printing nozzle to move in a vertical direction.

6. The multi-media three-dimensional additive printer according to claim 5, wherein a plurality of second cylinders are mounted on the top plate, wherein each second cylinder corresponds to one of the plurality of first cylinders, and wherein each second cylinder is used to drive the corresponding first cylinder to slide along a radius of the column in the top plate.

7. The multi-media three-dimensional additive printer according to claim 1, further comprising a motor and a driving gear, wherein the driving gear is coaxially and drivingly connected with an output shaft of the motor has a gear structure, and wherein the driving gear is engaged in the turntable.

8. The multi-media three-dimensional additive printer according to claim 1, further comprising a first support rod and a second support rod, wherein the first support rod and the second support rod both support the top plate and are fixedly connected with the top plate, and wherein axis of the first support rod, the second support rods, and the column are parallel with respect to each other.

9. The multi-media three-dimensional additive printer according to claim 1, further comprising a first supporting leg and a second supporting leg, wherein the first supporting leg and the second supporting leg are both mounted under the printing platform, and wherein a bottom of the first supporting leg and the second supporting leg are each mounted with a pulley; and wherein the first support leg and the second support leg cooperate with the column to form a triangular support structure.

10. The multi-media three-dimensional additive printer according to claim 9, wherein each pulley is a universal wheel.

* * * * *